(12) United States Patent
Netzer

(10) Patent No.: US 10,738,896 B2
(45) Date of Patent: Aug. 11, 2020

(54) VACUUM VALVE

(71) Applicant: VAT Holding AG, Haag (CH)

(72) Inventor: Martin Netzer, Bludenz (AT)

(73) Assignee: VAT Holding AG, Haag (CH)

(*) Notice: Subject to any disclaimer, the term of this patent is extended or adjusted under 35 U.S.C. 154(b) by 265 days.

(21) Appl. No.: 15/888,440

(22) Filed: Feb. 5, 2018

(65) Prior Publication Data

US 2018/0231133 A1 Aug. 16, 2018

(30) Foreign Application Priority Data

Feb. 15, 2017 (AT) .................... A 53/2017

(51) Int. Cl.
*F16K 3/316* (2006.01)
*F16K 3/18* (2006.01)
*F16K 31/122* (2006.01)
*F16K 51/02* (2006.01)

(52) U.S. Cl.
CPC .............. *F16K 3/316* (2013.01); *F16K 3/188* (2013.01); *F16K 31/122* (2013.01); *F16K 51/02* (2013.01)

(58) Field of Classification Search
CPC .......... F16K 3/316; F16K 3/188; F16K 51/02; F16K 31/122; F16K 3/18; F16K 3/30; F16K 3/314
See application file for complete search history.

(56) References Cited

U.S. PATENT DOCUMENTS

| | | | |
|---|---|---|---|
| 3,258,243 A | 6/1966 | Bryant | |
| 4,809,950 A | 3/1989 | Geiser | |
| 4,921,213 A | 5/1990 | Geiser | |
| 6,899,316 B2 | 5/2005 | Duelli | |
| 7,445,019 B2 | 11/2008 | Brenes et al. | |
| 9,086,173 B2 | 6/2015 | Ehrne | |
| 2014/0042354 A1 | 2/2014 | Orr | |
| 2015/0075659 A1 | 3/2015 | Rice et al. | |
| 2015/0136236 A1 | 5/2015 | Bachmann et al. | |
| 2016/0084389 A1 | 3/2016 | Wakabayashi et al. | |
| 2016/0153567 A1 | 6/2016 | Zanetti | |

FOREIGN PATENT DOCUMENTS

| | | |
|---|---|---|
| AT | 14814 | 6/2016 |
| DE | 3717724 | 12/1988 |
| JP | H04236862 | 8/1992 |
| JP | 3241456 | 5/1994 |
| JP | 2005240883 | 9/2005 |
| KR | 100629322 | 9/2006 |

*Primary Examiner* — Marina A Tietjen
(74) *Attorney, Agent, or Firm* — Volpe and Koenig, P.C.

(57) ABSTRACT

A vacuum valve is provided having a valve housing (1) which has a vacuum region (4) in the interior, a closure unit (5) which is arranged in the vacuum region (4) of the valve housing (1) and by which at least one valve opening (2, 3) is closable in a closed state of the vacuum valve, a longitudinal drive (11) by which the closure unit (5) is adjustable in a longitudinal direction (10) for adjusting the closure unit (5) between a position opening up the valve opening (2, 3) and a position covering the valve opening (2, 3). A longitudinal guide (19) for the displaceable guiding of the closure unit (5) parallel to the longitudinal direction (10) is provided, with this longitudinal guide having a guide rod (20) extending parallel to the longitudinal direction (10), and at least one guide part (21). At least one bearing element (36) of the guide part (21) is arranged in a region sealed off from the vacuum region (4) of the valve housing (1).

10 Claims, 10 Drawing Sheets

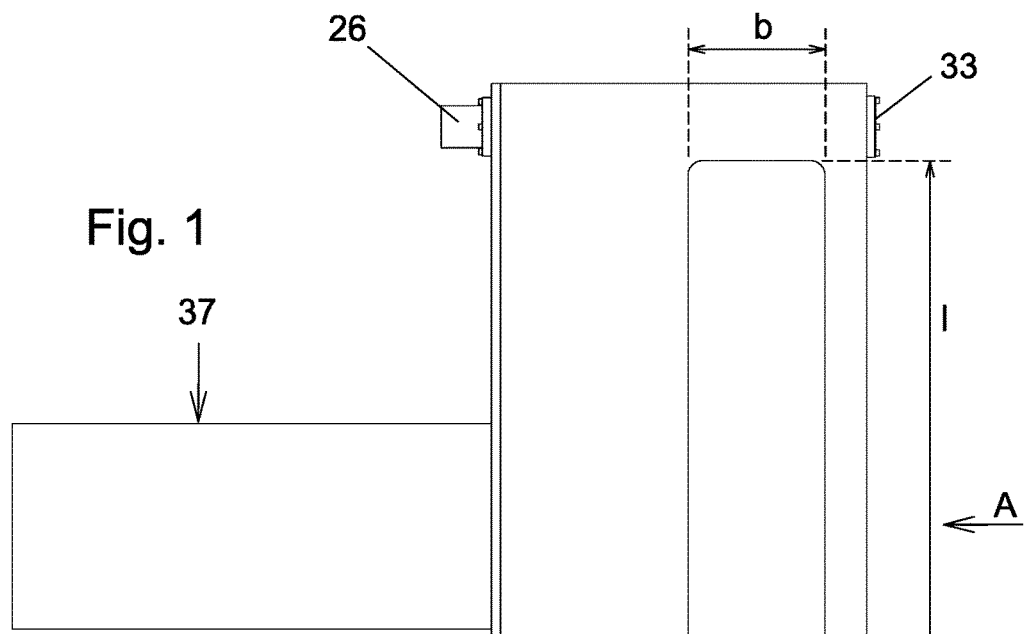
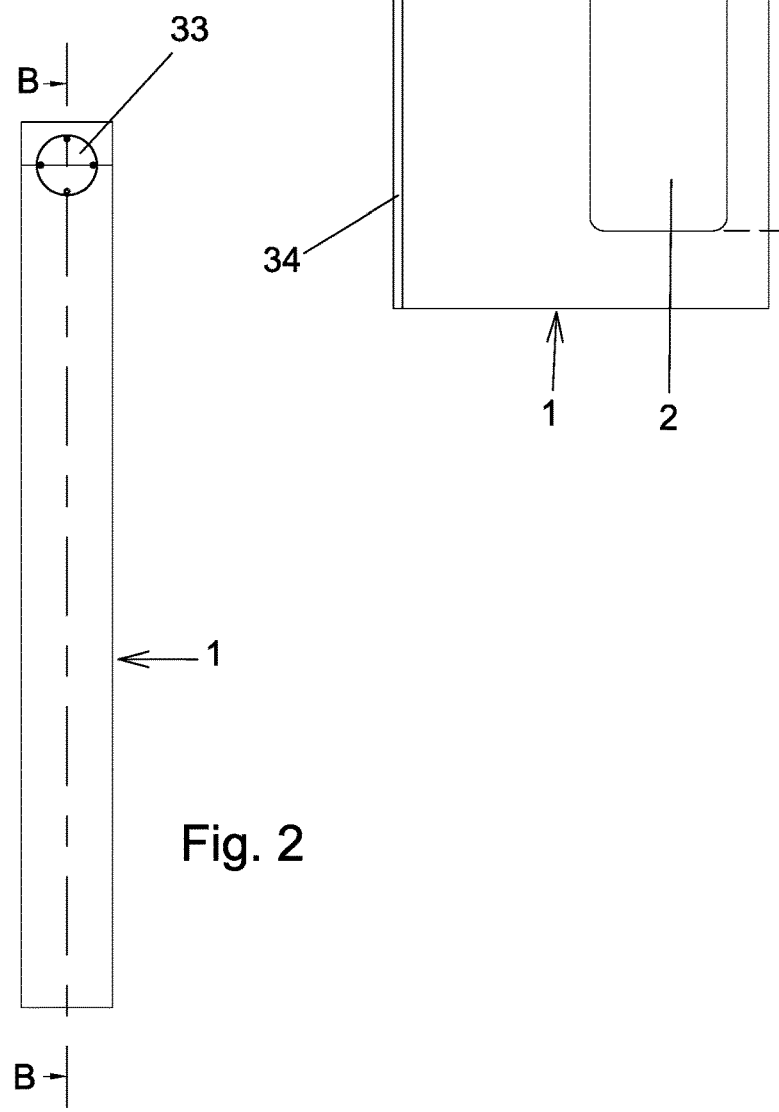

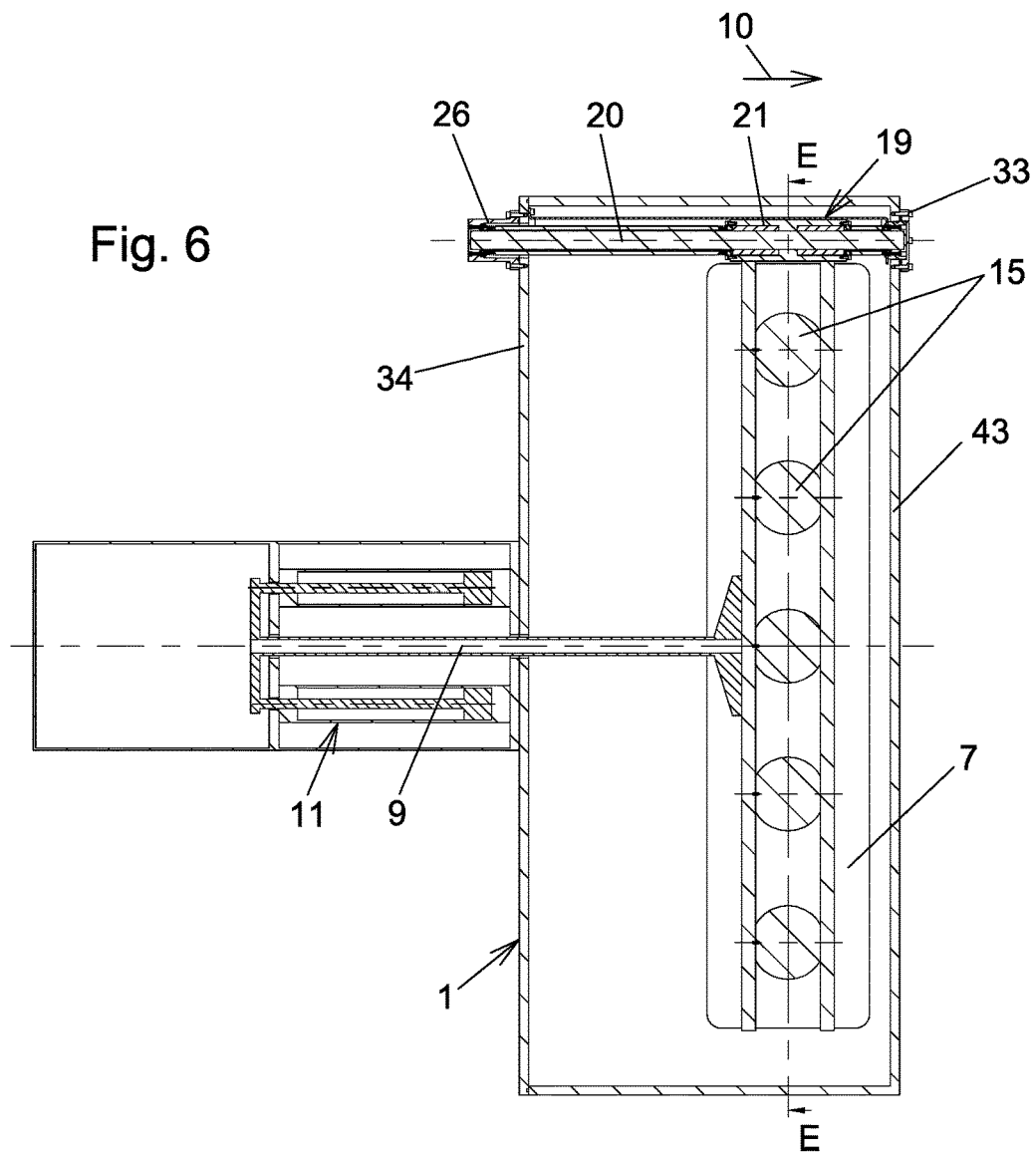
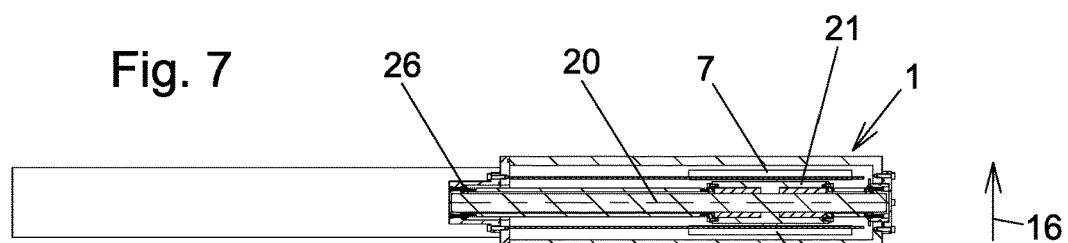
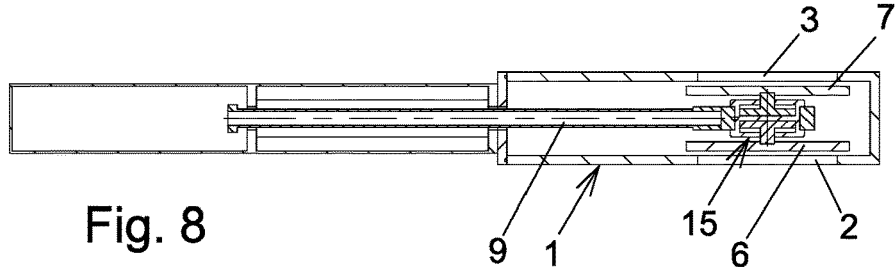

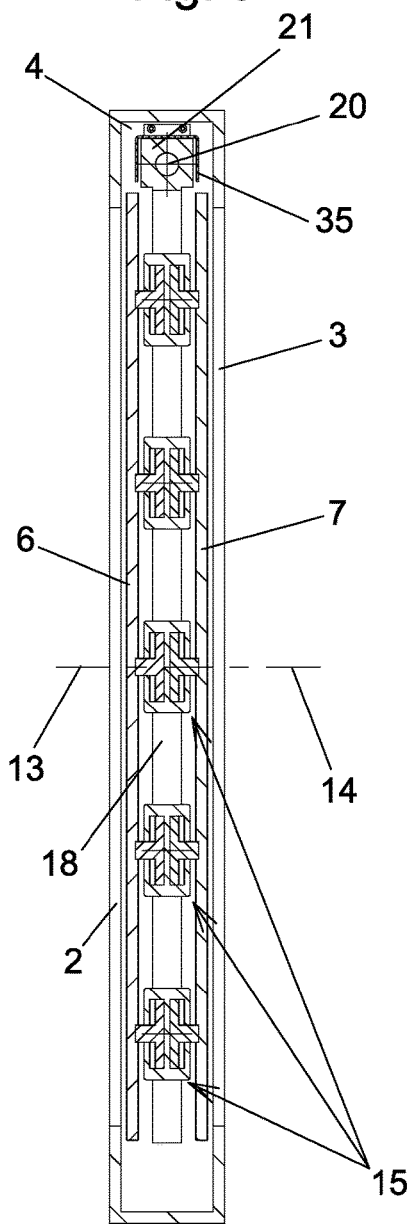
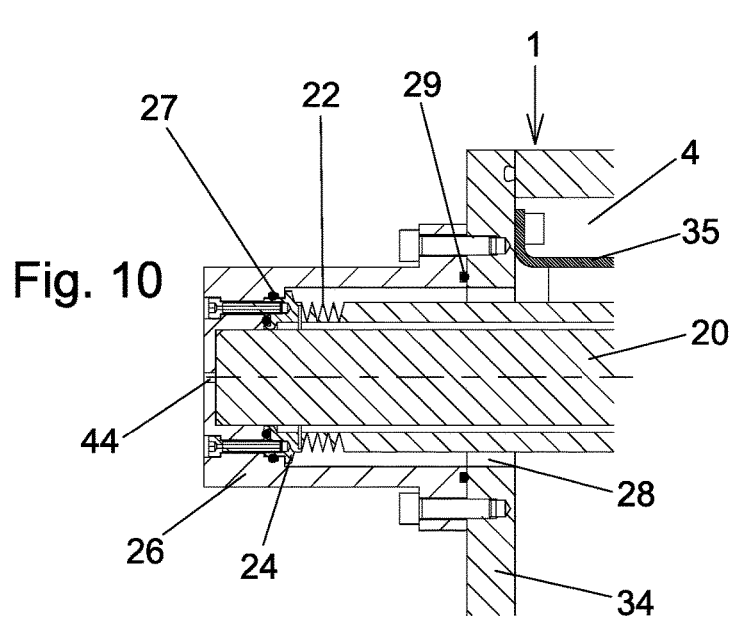
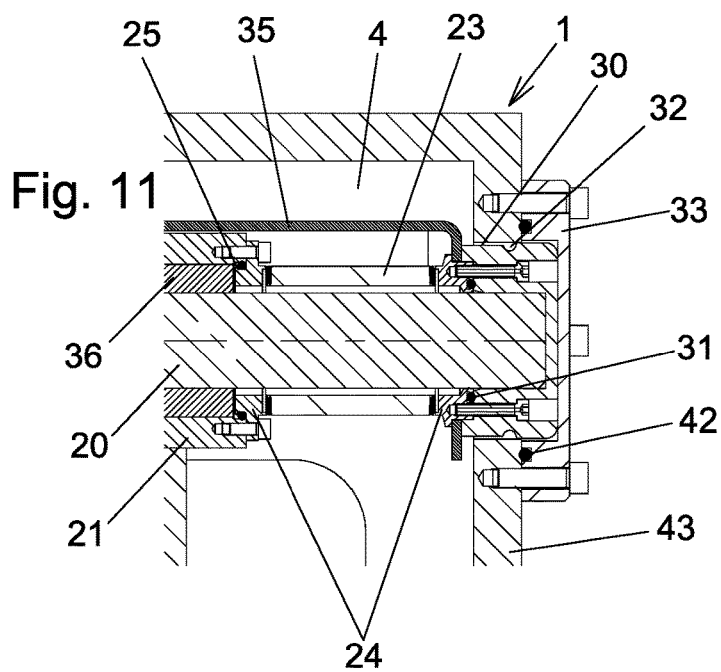
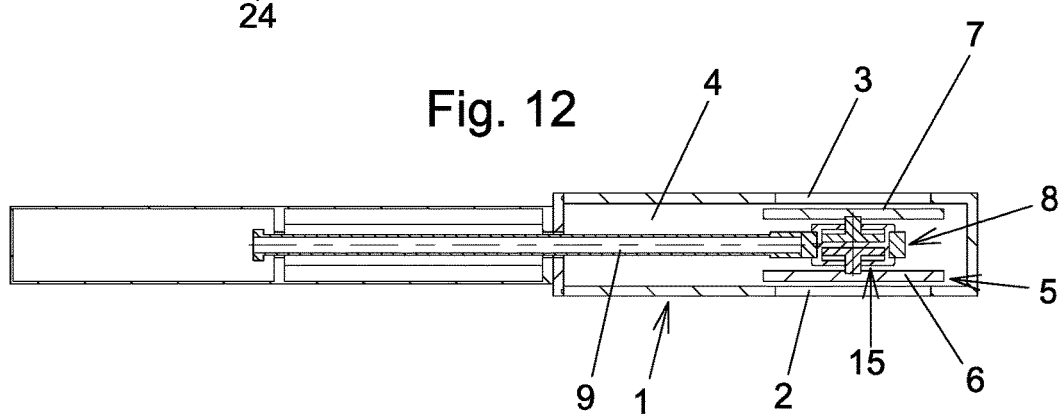

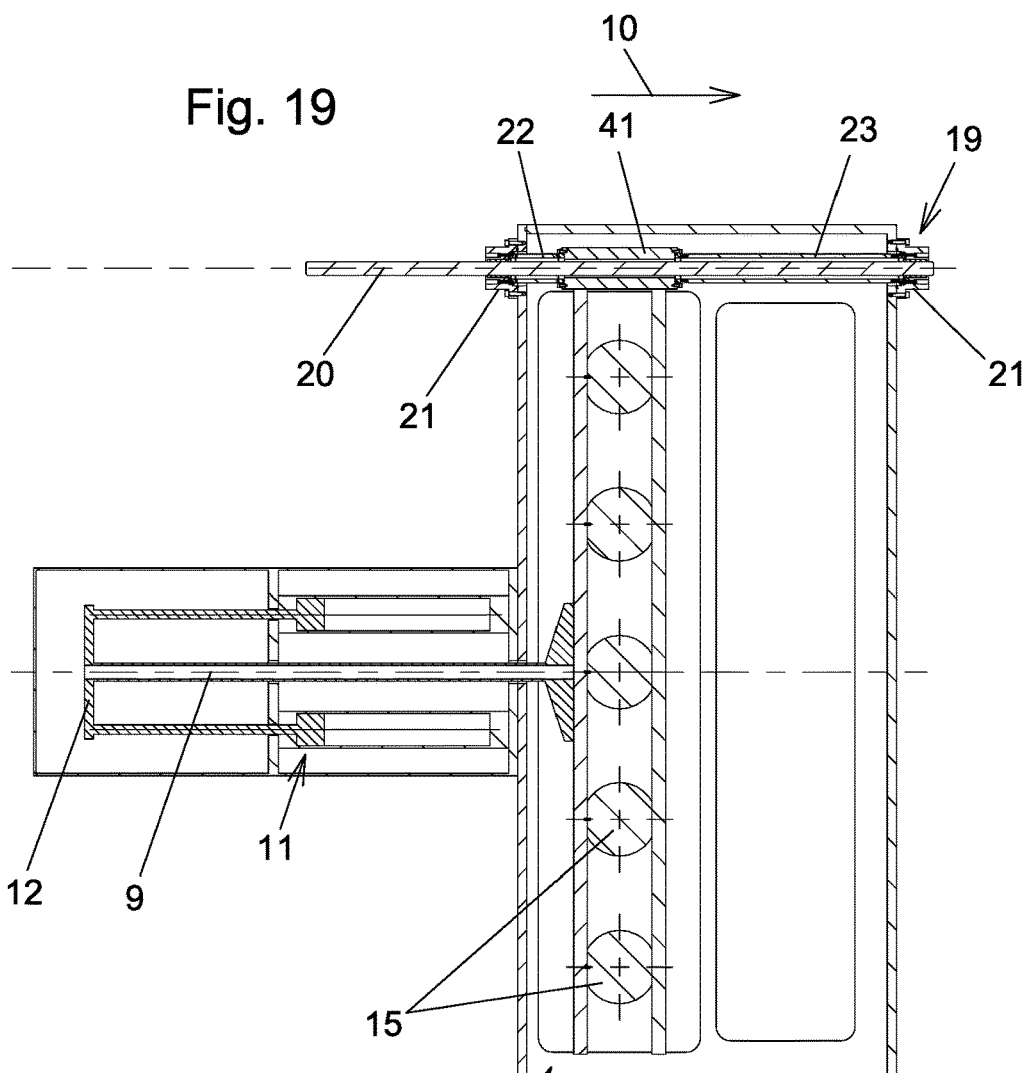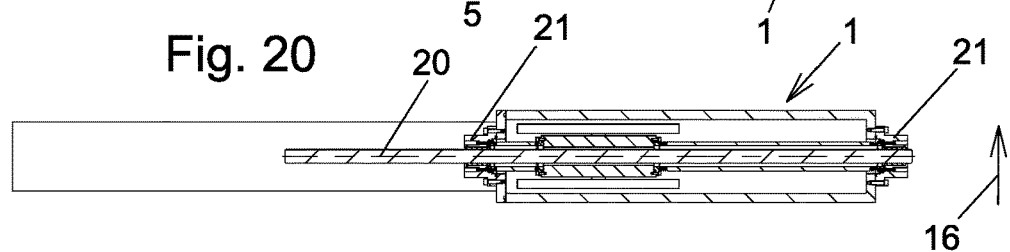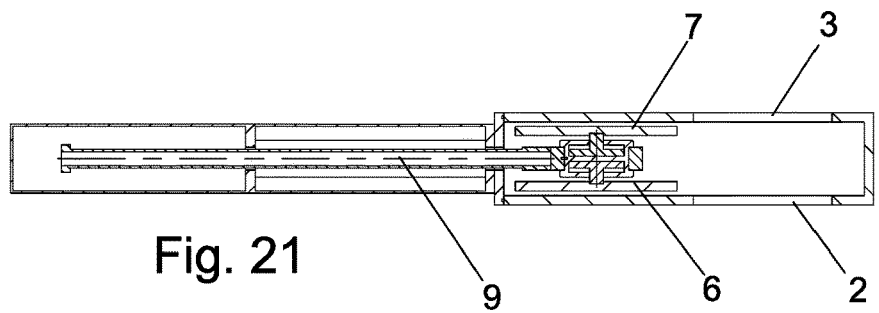

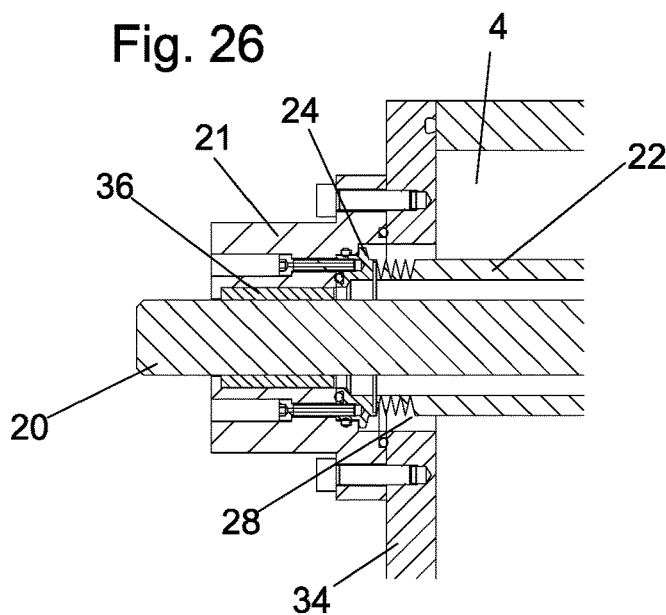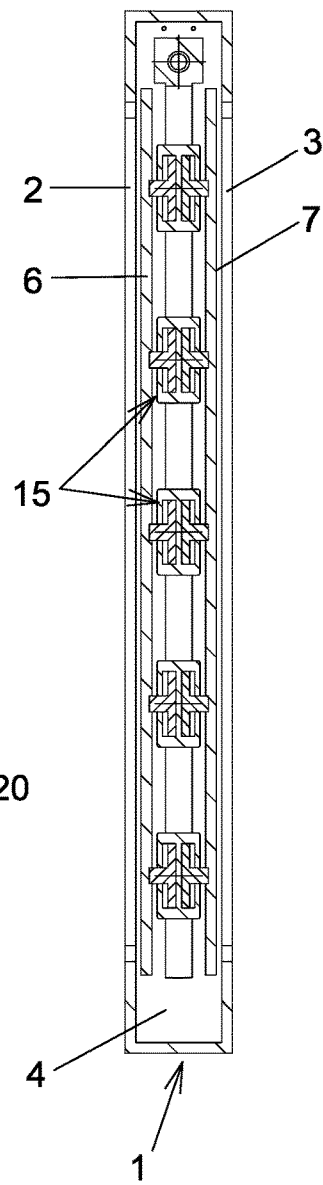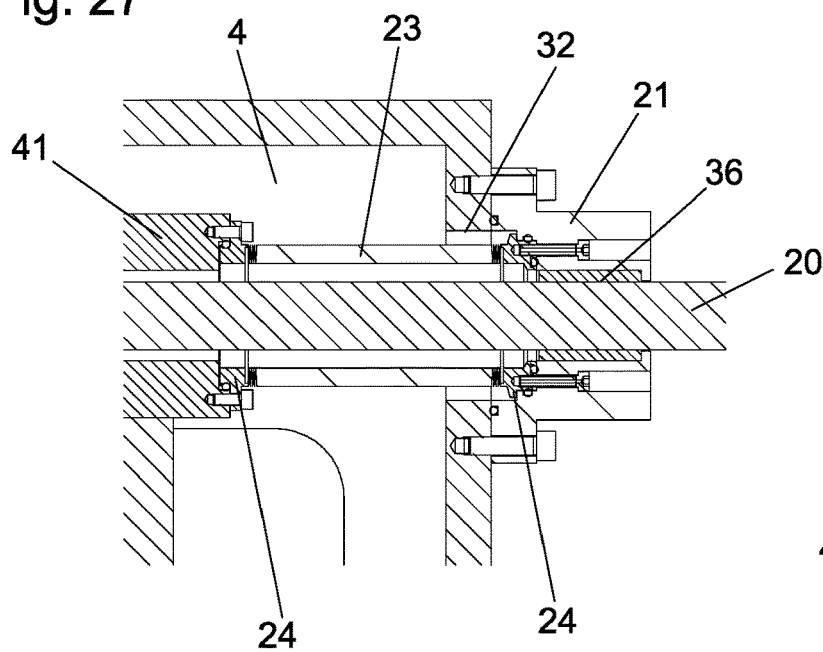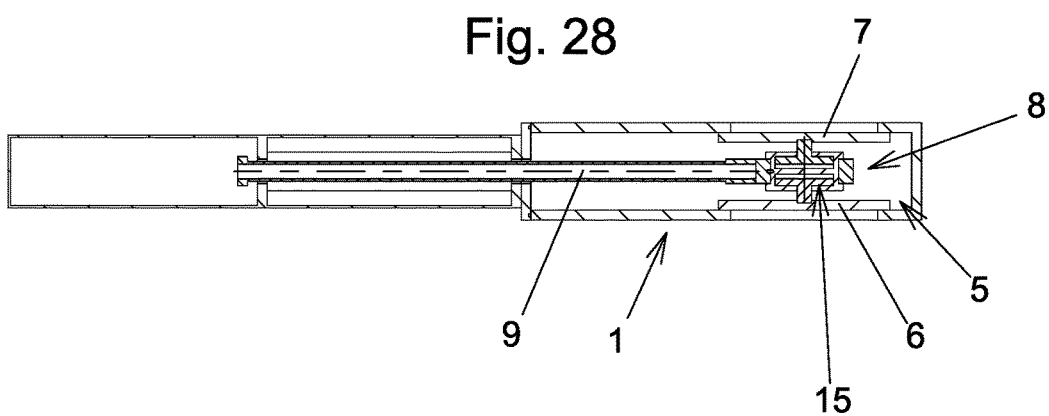

VACUUM VALVE

INCORPORATION BY REFERENCE

The following documents are incorporated herein by reference as if fully set forth: Austrian Patent Application No. A53/2017, filed Feb. 15, 2017

BACKGROUND

The invention relates to a vacuum valve comprising a valve housing which has a vacuum region in the interior, a closure unit which is arranged in the vacuum region of the valve housing and by which at least one valve opening is closable in a closed state of the vacuum valve, a longitudinal drive by which the closure unit is adjustable in a longitudinal direction for adjusting the closure unit between a position opening up the valve opening and a position covering the valve opening, a longitudinal guide for the displaceable guiding of the closure unit parallel to the longitudinal direction, said longitudinal guide having a guide rod extending parallel to the longitudinal direction, and at least one guide part, wherein the guide rod is attached to the valve housing, and the guide part to which the closure unit is attached is guided displaceably parallel to the longitudinal direction by the guide rod, or the at least one guide part is attached to the valve housing, and the guide rod to which the closure unit is attached is guided displaceably parallel to the longitudinal direction by the at least one guide part, and wherein the at least one guide part has at least one bearing element for the mounting of the guide part in relation to the guide rod so as to be displaceable parallel to the longitudinal direction or for the mounting of the guide rod in relation to the guide part so as to be displaceable parallel to the longitudinal direction.

U.S. Pat. No. 9,086,173 B2 reveals a vacuum valve, the closure unit of which has first and second valve plates which close opposite first and second valve openings in a valve housing in a closed state of the vacuum valve. The valve plates are supported by a supporting unit of the closure unit. The supporting unit is attached to a valve rod which is led out of the vacuum region of the valve housing. The valve openings are opened up in the open state of the vacuum valve.

In order to close the vacuum valve, the supporting unit is displaced by a longitudinal drive, which is arranged outside the vacuum region, in front of the valve opening by axial displacement of the valve rod, wherein the valve plates are still raised from the valve seats. The supporting unit is here guided displaceably in relation to the valve housing parallel to the longitudinal direction by longitudinal guides on opposite sides. The closure unit has transverse drive elements, by which the valve plates are consequently pressed against the valve seats.

Instead of transverse drive elements, spreading elements, such as wedge elements, rollers, etc., could also be present in order to press the two valve plates against the valve seats. This would then be brought about by the longitudinal drive after the supporting unit has run against an end stop during closing of the vacuum valve. Closure mechanisms of this type are known in diverse embodiments in the prior art.

Such vacuum valves are used in particular in vacuum systems for carrying out vacuum processes, especially in semiconductor technology or in coating technology, for example for producing screens. Substrates to be processed are guided here through such vacuum valves in order to transfer the substrates from one vacuum chamber into an adjacent vacuum chamber. In the case of relatively large plate-like substrates, the valve openings are of slot-shaped design, i.e. have a substantially greater length than width. With an increasing size of the substrates to be processed, transport of the substrates in a horizontal orientation becomes increasingly more difficult or no longer possible because of the risk of buckling. A vertical (upright or hanging) or approximately vertical transport of such substrates is therefore already known. For this purpose, the slot-shaped valve openings are oriented vertically or approximately vertically. The closure unit is oriented correspondingly for this purpose.

A vacuum valve of this type is revealed, for example, in AT 14814 U. In order to be able to carry out servicing of the valve in a simple manner, it is described in this document that the closure unit has at least one rail, by which the closure unit, hanging on the rail or standing on the rail, can be pulled out of the valve housing into a servicing position. For this purpose, either additional rails, along which the closure unit can be moved out of the valve housing, are fitted after removal of a housing part of the valve housing, or, for the longitudinal guidance of the closure unit in relation to the valve housing, there are telescopic rails, by which the closure unit can be pulled out of the valve housing.

A similar vacuum valve is also revealed in JP-3241456 B2.

U.S. Pat. No. 6,899,316 B2 reveals a vacuum valve in which the closure unit has only one valve plate in order to close a valve opening in the valve housing in the closed state of the vacuum valve. Analogously as in the case of the valve known from U.S. Pat. No. 9,086,173 B2, a longitudinal drive arranged outside the vacuum region, and transverse drive elements arranged on the closure unit are present. The closure unit is guided displaceably in the longitudinal direction in relation to the valve housing on opposite sides.

A closure of a valve opening of a valve housing could also be carried out merely by a linear movement of the closure member, in particular by a three-dimensional sealing surface, as is revealed, for example, in DE 37 17 724 A1 or U.S. Pat. No. 4,921,213 A.

SUMMARY

It is the object of the invention to provide an advantageous vacuum valve of the type mentioned at the beginning which is suitable in particular for the passage of large plate-like substrates, in particular in a vertical or substantially vertical orientation. This is achieved by a vacuum valve with having one or more features of the invention.

In the case of the vacuum valve of the invention, the at least one bearing element of the at least one guide part is arranged in a region sealed off from the vacuum region of the valve housing.

This sealed region can be connected to the atmosphere. An evacuation of said sealed region is also basically conceivable and possible.

By the design according to the invention, particles arising in the region of the at least one bearing element during the adjustment of the closure unit do not pass into the vacuum region of the vacuum valve, and therefore sensitive substrates are protected against impurities.

The closure unit is advantageously held in a hanging manner on the longitudinal guide. A hanging holding of the closure unit on the longitudinal guide means that the longitudinal guide which is arranged above the closure unit supports at least a large part of the weight of the closure unit, i.e. at least more than 50% of the weight of the closure unit, preferably at least substantially the entire weight of the closure unit.

By the hanging arrangement of the closure unit, the latter can be formed with relatively little buckling resistance, and therefore material costs can be saved. In an advantageous embodiment, a longitudinal guide of the closure unit in the region below the closure unit can be completely dispensed with.

The guide part or a respective guide part can advantageously have a passage opening through which the guide rod passes. An advantageous design of the sealed region for the at least one bearing element is thereby made possible. For this purpose, the at least one guide part can preferably be connected to at least one diaphragm bellows which is a continuation of the sealed region and through which the guide rod runs. The guide rod can have, for example, a circular cross section, at least over the region of the relative displaceability between the guide rod and the at least one guide part.

In the case of the longitudinal guide according to the invention, either the guide rod can be attached to the valve housing, and the at least one guide part, to which the closure unit is attached, can be displaceable along the guide rod parallel to the longitudinal direction in relation to the guide rod and therefore in relation to the valve housing, or the at least one guide part can be attached to the valve housing, and the guide rod, to which the closure unit is attached, can be displaceable in relation to the at least one guide part parallel to the longitudinal direction in relation to the at least one guide part and therefore in relation to the valve housing.

In an advantageous embodiment, the guide rod can run between opposite walls of the vacuum valve, and the at least one guide part can be guided displaceably along the guide rod, wherein the at least one guide part is arranged in the interior of the valve housing, and first and second diaphragm bellows are connected to the guide part on opposite sides, said diaphragm bellows being a continuation of the sealed region, in which the at least one bearing element is arranged, and through which the guide rod runs. In another possible embodiment, first and second guide parts, by which the valve rod is guided displaceably, can be attached to the outer side of the valve housing on opposite sides of the valve housing, wherein the diaphragm bellows which is connected to the respective guide part extends through a respective opening in the valve housing into the interior of the valve housing.

BRIEF DESCRIPTION OF THE DRAWINGS

Further advantages and details of the invention are explained below with reference to the attached drawing, in which:

FIG. 1 shows a view of a vacuum valve according to a first exemplary embodiment of the invention, in the open state of the vacuum valve;

FIG. 2 shows an end-side view, viewing direction A in FIG. 1;

FIG. 6, FIG. 7 and FIG. 8 show sections analogous to FIGS. 3 to 5 in the "half-closed" state of the vacuum valve;

FIG. 9 shows a section along the line EE of FIG. 6;

FIGS. 10 and 11 show enlarged details of FIG. 6;

FIG. 12 shows a section analogous to FIG. 8 in the completely closed state of the vacuum valve;

FIGS. 17 to 28 show views and sections analogous to FIGS. 1 to 12 for a second exemplary embodiment of the invention.

DETAILED DESCRIPTION OF THE PREFERRED EMBODIMENTS

Figure 3:
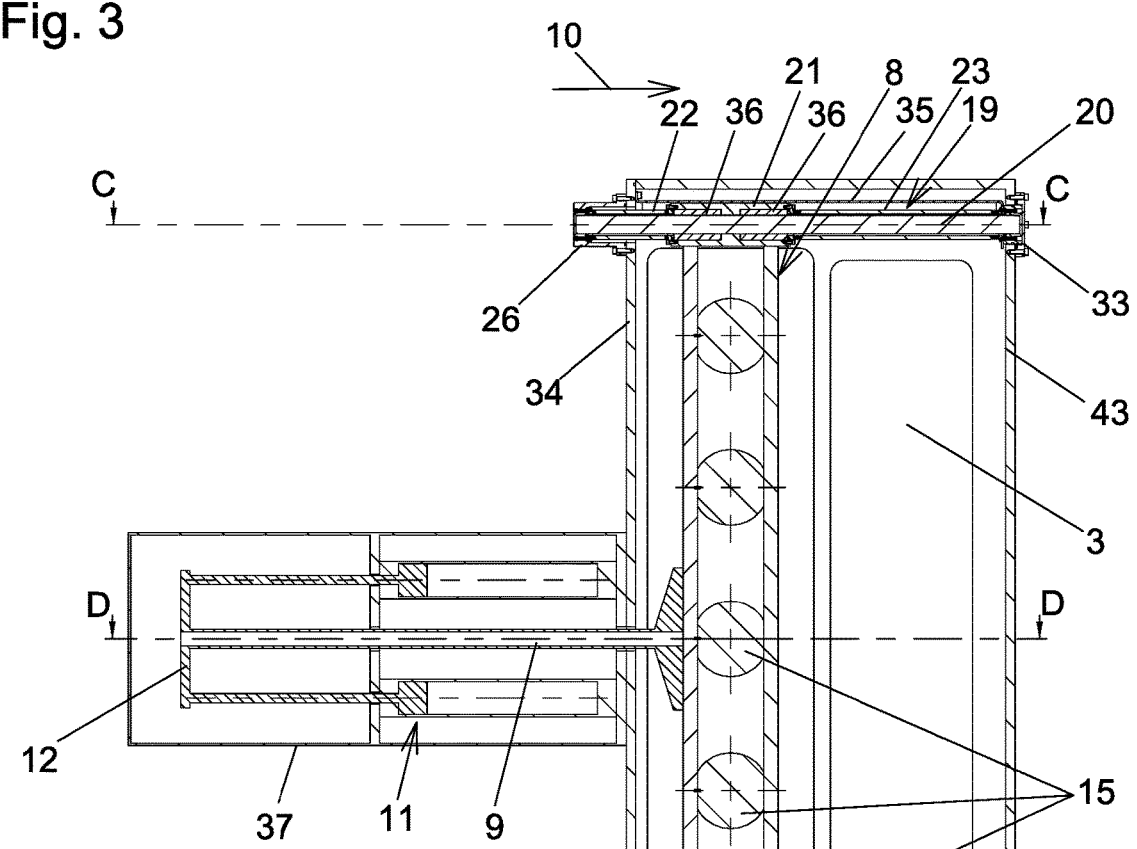
FIG. 3 shows a section along the line BB of FIG. 2.
Figure 4:
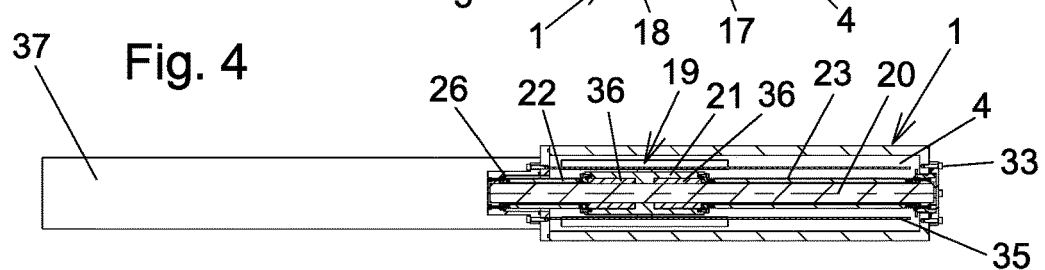
FIG. 4 shows a section along the line CC of FIG. 3.
Figure 5:
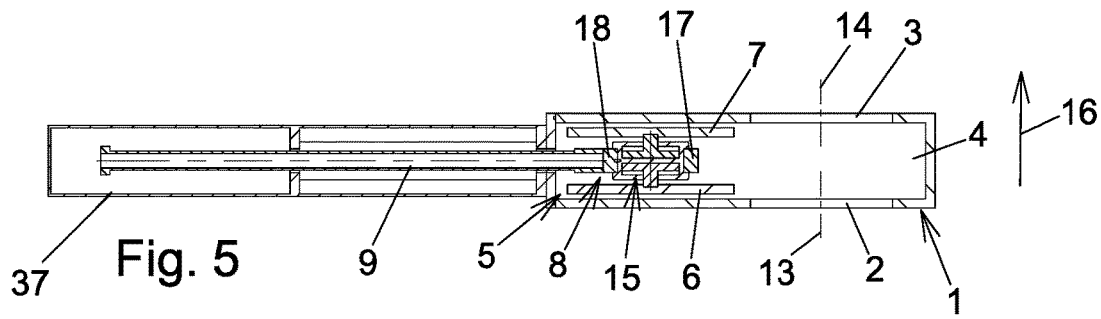
FIG. 5 shows a section along the line DD of FIG. 3.
Figure 13:
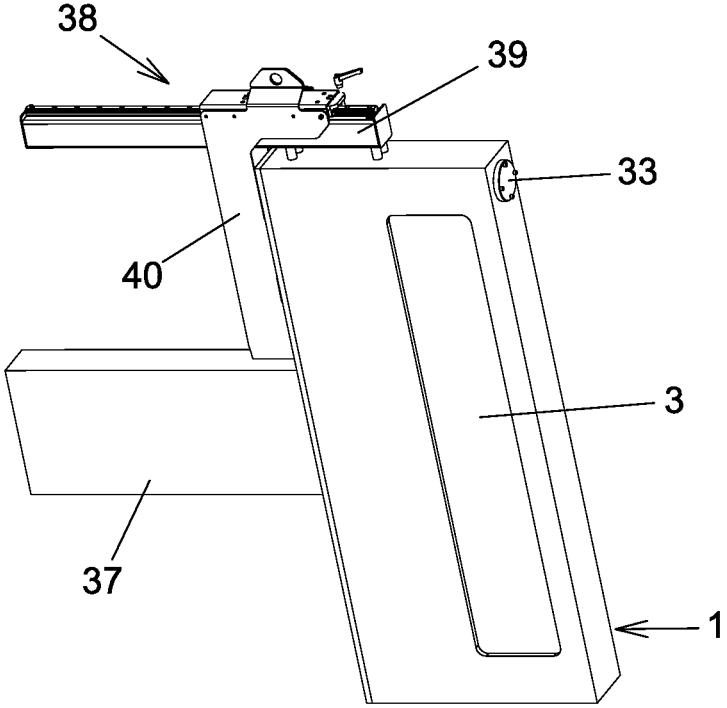
FIG. 13 shows an oblique view of the vacuum valve with a servicing-assisting device attached thereto.
Figure 14:
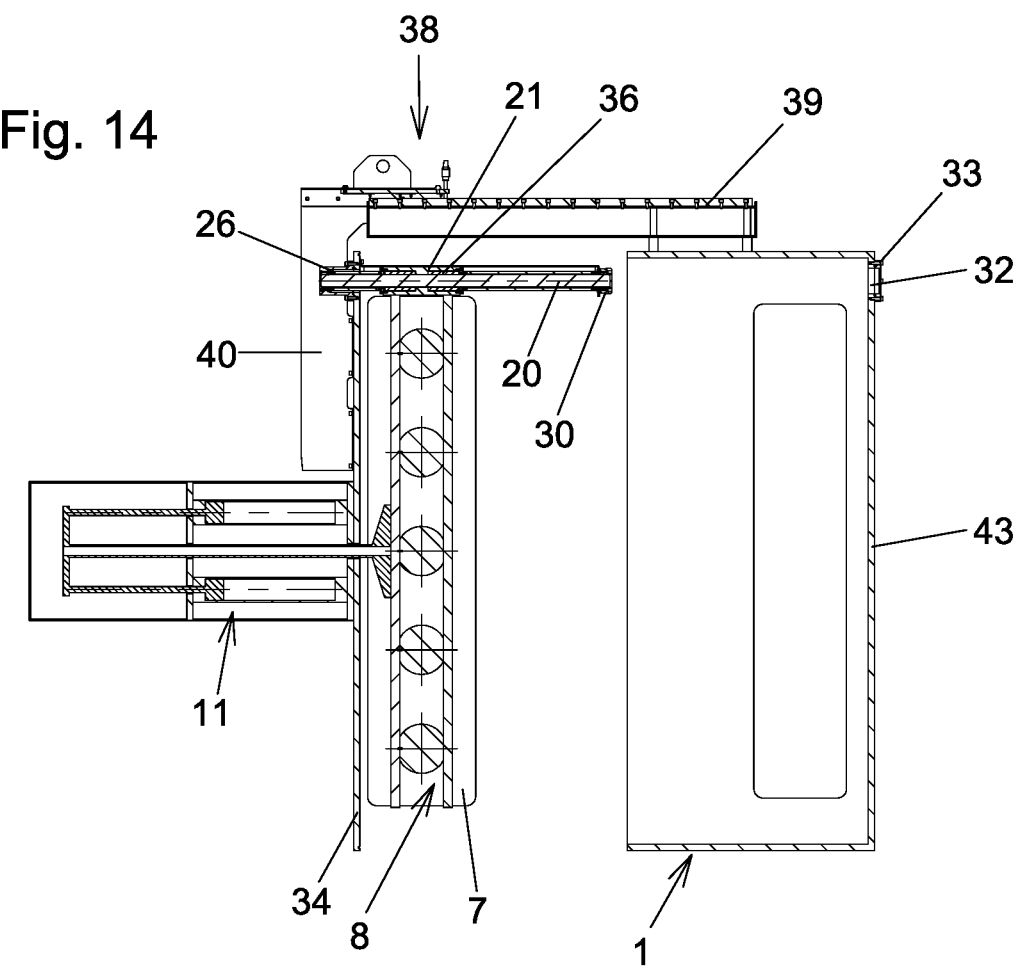
FIG. 14 shows a section analogous to FIG. 3, but with the servicing-assisting device and in a servicing position of the vacuum valve.
Figure 15:
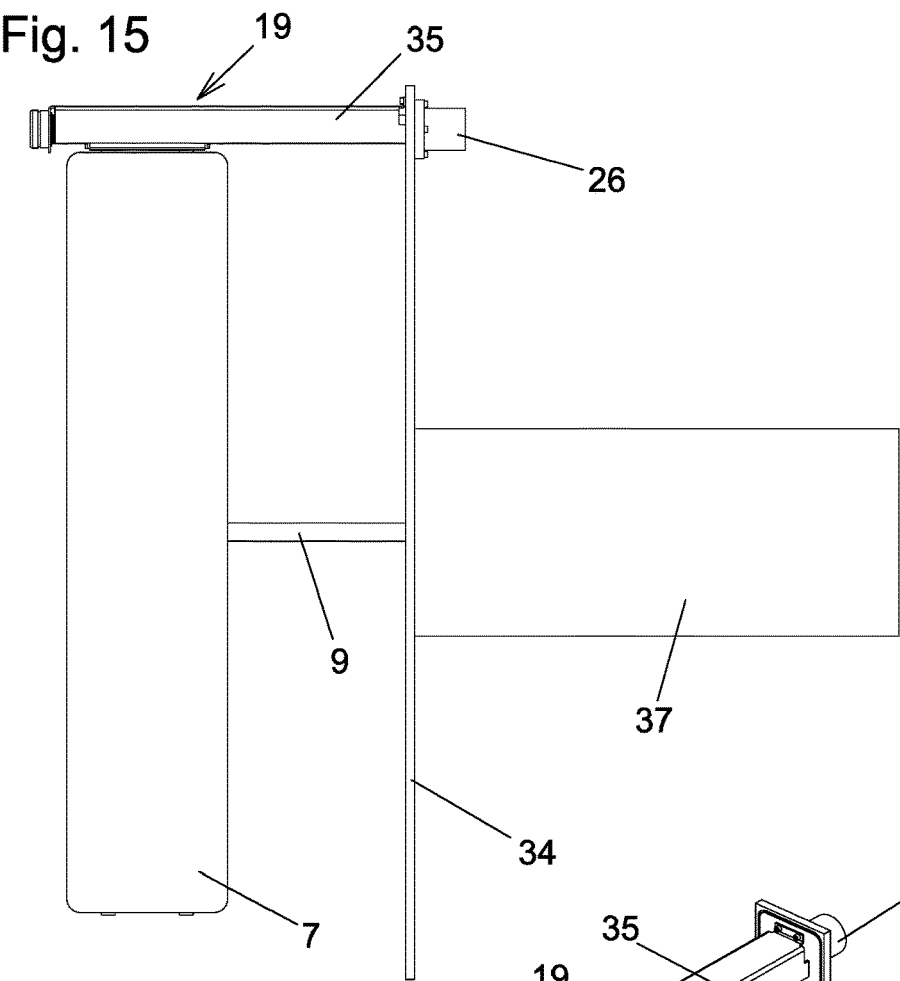
FIG. 15 and FIG. 16 show a view and an oblique view of the unit which can be pulled out together from the valve housing.

A first exemplary embodiment of the invention is explained below with reference to FIGS. 1 to 16.

The vacuum valve has a valve housing 1 with first and second valve openings 2, 3 which are arranged in opposite walls and which preferably have the same shape and size.

A vacuum region 4 is located within the valve housing 1, i.e. the vacuum valve is designed in such a manner that, at least for a certain time which is at least more than an hour, a vacuum of 10-3 mbar can be maintained in said vacuum region 4 when the first and second valve opening 2, 3 are closed (for example by a blind flange).

A closure unit 5 is arranged in the vacuum region 4 of the vacuum valve. The closure unit 5 has first and second valve plates 6, 7 which are supported by a supporting unit 8. The supporting unit 8 is attached to a valve rod 9 which is led out of the vacuum region 4. For this purpose, use can be made of a known vacuum-tight linear lead-through. In the exemplary embodiment, a sealed sliding guide is illustrated schematically. In an advantageous manner, a bellows lead-through can also be used.

The valve rod 9 is oriented in a longitudinal direction 10, i.e. the longitudinal center axis of the valve rod 9 extends parallel to the longitudinal direction 10.

A longitudinal drive 11 serves for displacing the valve rod 9 parallel to the longitudinal direction 10 and therefore for adjusting the closure unit 5 parallel to the longitudinal direction 10. In the exemplary embodiment, this longitudinal drive is realized by two pneumatic piston-cylinder units which are connected to each other and to the valve rod 9 via a yoke 12. The longitudinal drive can also be formed in a different manner. The longitudinal drive 11 can also have different actuators than pneumatically operated actuators.

The first and second valve plate 6, 7 serve for the vacuum-tight closing of the first and second valve opening 2, 3 in the closed state of the vacuum valve (FIG. 12). For this purpose, said valve plates are pressed onto valve seats surrounding the valve openings 2, 3. For the sealing, use is made in a conventional manner of an elastic sealing ring which can be arranged (not illustrated in the figures) in each case on the valve plate 6, 7 or on the sealing seat.

For closing the vacuum valve from its open state (FIGS. 1 to 5) in which the valve plate 6, 7 each take up an open position, the closure unit is first of all displaced by the longitudinal drive 11 from its position opening up the valve opening into a position covering the valve openings 2, 3 (FIGS. 6 to 11). The valve plates 6, 7 cover the valve openings 2, 3 completely there, as seen in the direction of the parallel axes 13, 14 of the first and second valve opening 2, 3, but are still raised (=spaced apart) from the valve seats in the exemplary embodiment. In order to displace the valve plates 6, 7 from said intermediate positions (="half-closed" state of the vacuum valve) in the transverse direction 16 in order to adjust the valve plates 6, 7 into their closed positions, in which they are pressed against the valve seats, use is made of transverse drives 15 of the supporting unit 8. These transverse drives are illustrated only in simplified form in the figures. Pneumatically actuated piston-cylinder units are involved in the exemplary embodiment. In the exemplary embodiment, a plurality of transverse drives 15 which are spaced apart from one another in the vertical direction are provided, as this is preferred.

In the exemplary embodiment shown, the supporting unit 8 has first and second support rods 17, 18 which extend at right angles to the longitudinal direction 10 and at right angles to the transverse direction 16 and which are connected by the cylinder housings of the transverse drives 15. This is likewise illustrated only in simplified form in the figures.

The closure unit 5 can be designed, for example, analogously to U.S. Pat. No. 9,086,173 B2, which is mentioned in the introductory part of the description.

The valve openings 2, 3 have a substantially greater length l than width b; the length l is preferably more than four times the width b. The valve openings 2, 3 are therefore of slot-shaped design. The valve plates 6, 7 have a shape corresponding thereto. The vacuum valve can therefore be used in particular for the passage of plate-like substrates. The vacuum valve is designed here for standing or at least substantially standing transport of such plate-like substrates. The longitudinal extent of the first and second valve opening therefore lies at least substantially vertically in the provided installation state. The deviation of the longitudinal extent of the valve openings 2, 3 from the vertical advantageously lies within a range of at most +/−30°, preferably at most +/−20°.

The closure unit 5 is guided displaceably parallel to the longitudinal direction 10 by a longitudinal guide 19 which is located above the closure unit 5 in the exemplary embodiment, as is preferred. The longitudinal guide 19 has a preferably circular-cylindrical guide rod 20 which is oriented in the longitudinal direction 10, i.e. the longitudinal axis of the guide rod 20 lies parallel to the longitudinal direction 10. In the exemplary embodiment according to FIGS. 1 to 16, the guide rod 20 is held by the valve housing and is not moved by the longitudinal drive 11 during the adjustment of the closure unit 5 taking place parallel to the longitudinal direction 10. A sleeve-shaped guide part 21, through which the guide rod 20 passes through a passage opening, is guided displaceably parallel to the longitudinal direction 10 by the guide rod 20. The supporting unit 8 is attached to the guide part 21 in the region of the upper end thereof. As a result, the closure unit 5 is held in a manner hanging on the longitudinal guide 19. The longitudinal guide 19 here bears at least the predominant part of the weight of the supporting unit 8 (=more than half of the weight of the supporting unit 8), preferably at least substantially the entire weight of the supporting unit 8.

The guide rod is oriented horizontally (with respect to the operating state of the vacuum valve), i.e. the longitudinal direction 10 is oriented horizontally. A deviation from the horizontal of preferably less than 30°, particularly preferably less than 20°, can also be provided. If the longitudinal extent of the valve openings 2, 3 is oriented at right angles to the guide rod 20, the longitudinal extent of the valve openings 2, 3 thus has a corresponding deviation from the vertical orientation. Plate-like substrates can therefore be transported in a corresponding inclination in relation to the vertical orientation through the valve openings 2, 3. In comparison to a completely vertical orientation of the substrates, the transport device for the substrates can thereby be designed more simply (since the substrates have to be supported only on the side toward which they are inclined). An orientation of the longitudinal extent of the valve openings 2, 3 that is inclined in relation to the vertical orientation could also be achieved in a horizontal position of the guide rod 20 by the closure unit being connected to the longitudinal guide 19 in such a manner that the longitudinal extent of the valve plates 6, 7 have a corresponding deviation from the right angled orientation with respect to the guide rod 20.

Bearing elements 36 arranged in the region of the passage opening through the guide part 21 serve for the displaceable guidance of the guide part 21 along the guide rod 20. The bearing elements 36 are only indicated schematically in the figures. For example, such bearing elements 36 can be formed by rolling bodies. In an advantageous embodiment, ball circulating guides, for example, can be provided. On the other hand, for example, at least one bearing element in the form of a sliding bushing or a sliding coating could also be provided.

The guide part 21 is in each case connected in a vacuum-tight manner on opposite sides to one end of a diaphragm bellows 22, 23, within which the guide rod 20 runs. At the other ends, the diaphragm bellows 22, 23 are connected in a vacuum-tight manner to connection pieces 26, 33.

Only the end-side diaphragms of the diaphragms of the diaphragm bellows 22, 23 are in each case illustrated graphically; the diaphragm bellows 22, 23 are merely indicated by shaded surfaces in their central regions.

At their two ends, the diaphragm bellows 22, 23 each have an end piece 24 which is welded onto the end-side diaphragm. For the connection of the diaphragm bellows 22, 23 to the guide part 21, the adjacent end pieces 24 are screwed onto the guide part 21, wherein a sealing ring 25 lying in between is provided for the sealing. The end piece 24 at the other end of the diaphragm bellows 22 is connected to a cup-shaped connection piece 26, wherein a sealing ring 27 located in between is provided for the sealing. The cup-shaped connection piece 26 for its part is screwed onto the valve housing 1 from the outside (with a sealing ring 29 located in between) in the region of an opening 28 in said valve housing, wherein the vacuum region 4 of the valve housing 1 therefore continues between the connection piece 26 and the diaphragm bellows 22.

At the other end of the diaphragm bellows 23, the end piece 24 thereof is screwed onto a plug-in piece 30 (with a sealing ring 31 located in between). The plug-in piece 30 is plugged through an opening 32 in the valve housing 1 into a recess of a connection piece 33. The connection piece 33 is screwed in the region of the opening 32 onto the outside of the valve housing 1 (with a sealing ring 42 located in between), and therefore the vacuum region 4 of the valve housing 1 continues in the gap between the plug-in piece 30 and the opening 32 in the valve housing or the recess of the connection piece 33.

The guide rod 20 is fixedly connected to the plug-in piece 30, for example by the guide rod 20 being pressed into a recess of the plug-in piece 30.

The guide rod 20 therefore runs between the wall 34 of the valve housing and the opposite wall 43 of the valve housing.

The space lying between the diaphragm bellows 22, 23 and the guide rod 20 and between the passage opening through the guide part 21 and the guide rod 20 is therefore sealed in relation to the vacuum region 4 of the valve housing 1. This space which is sealed in relation to the vacuum region 4 of the valve housing 1 is closed in the exemplary embodiment by the plug-in piece 30 at that end of the diaphragm bellows 23 which is remote from the guide part 21. It would also be basically conceivable and possible for the plug-in piece 30 to be omitted and the diaphragm bellows 23 to be connected directly to the guide rod 20 in a vacuum-tight manner (at a distance from the end of the guide rod 20) and for the end of the guide rod 20 to be plugged directly into the recess of the connection piece 33.

The previously described space which is sealed off from the vacuum region 4 of the valve housing 1 is connected to the atmosphere, by an opening 44 in the connection piece 26 in the exemplary embodiment. Instead, said sealed space could basically also be evacuated or completely closed (hermetically sealed).

A space which is sealed in relation to the vacuum region 4 of the valve housing therefore lies in the interior of the valve housing 1. The bearing elements 36 for the displaceable guiding of the guide part 21 in relation to the guide rod 20 are also located in said sealed space.

The wall 34 of the vacuum valve, to which wall the connection piece 26 is screwed, is removable from the rest of the valve housing 1 (after opening screws which are not illustrated in the figures). In order to be able to remove said wall 34 from the valve housing 1, the plug-in piece 30 can be pulled out of the connection piece 33. A plug-in connection to the opposite wall 43 is therefore formed for that end of the guide rod 20 which is removed from the removable wall 34.

Figure 16:
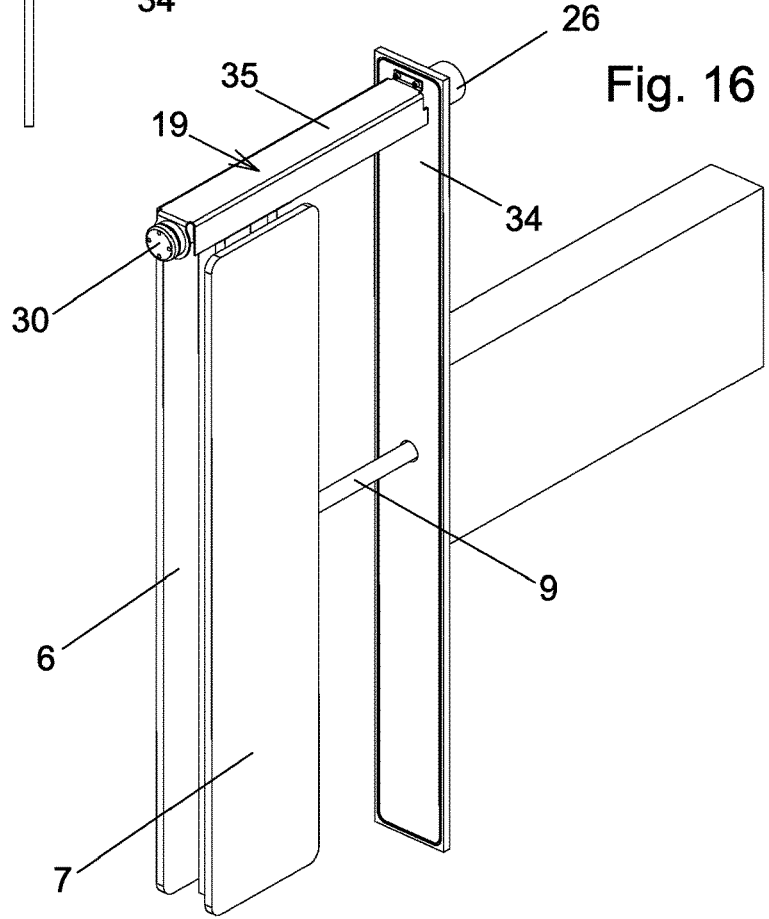
Figure 17:
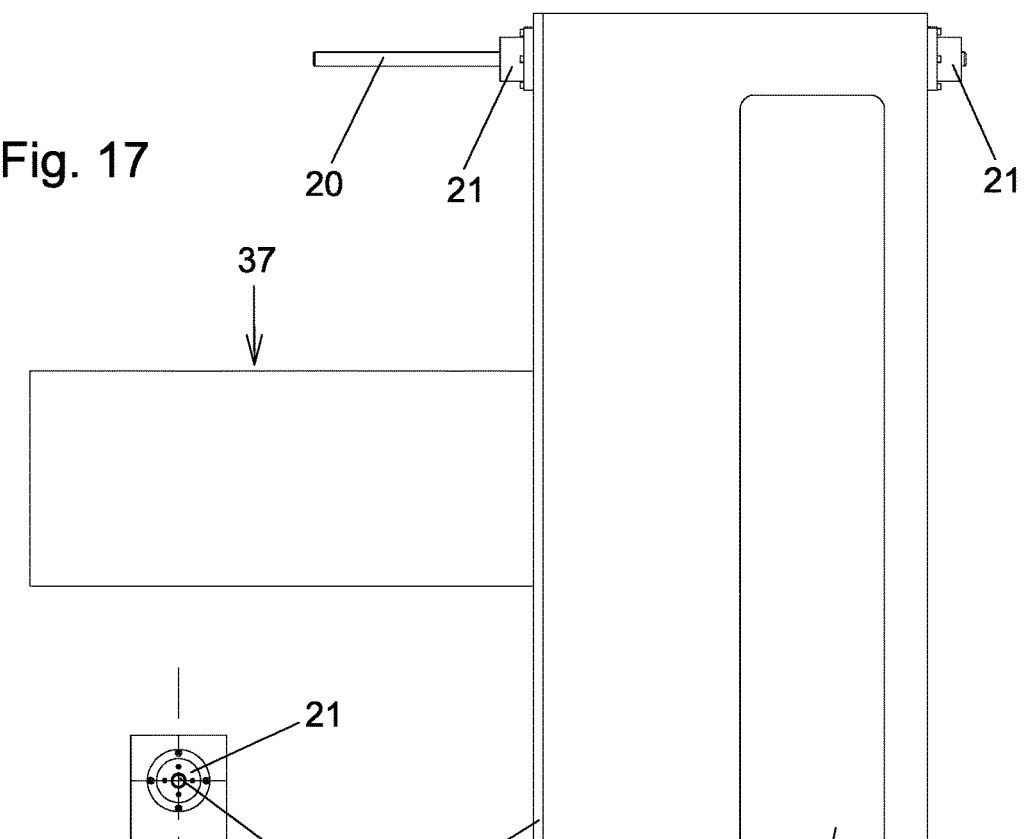
Figure 18:
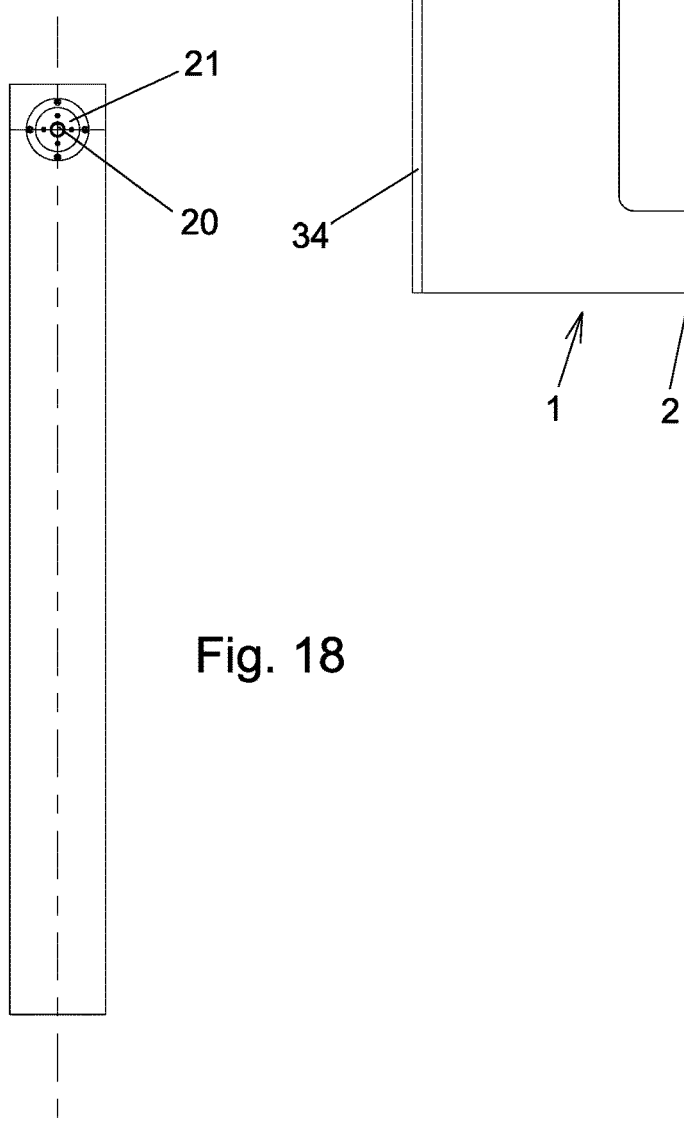
Figure 22:
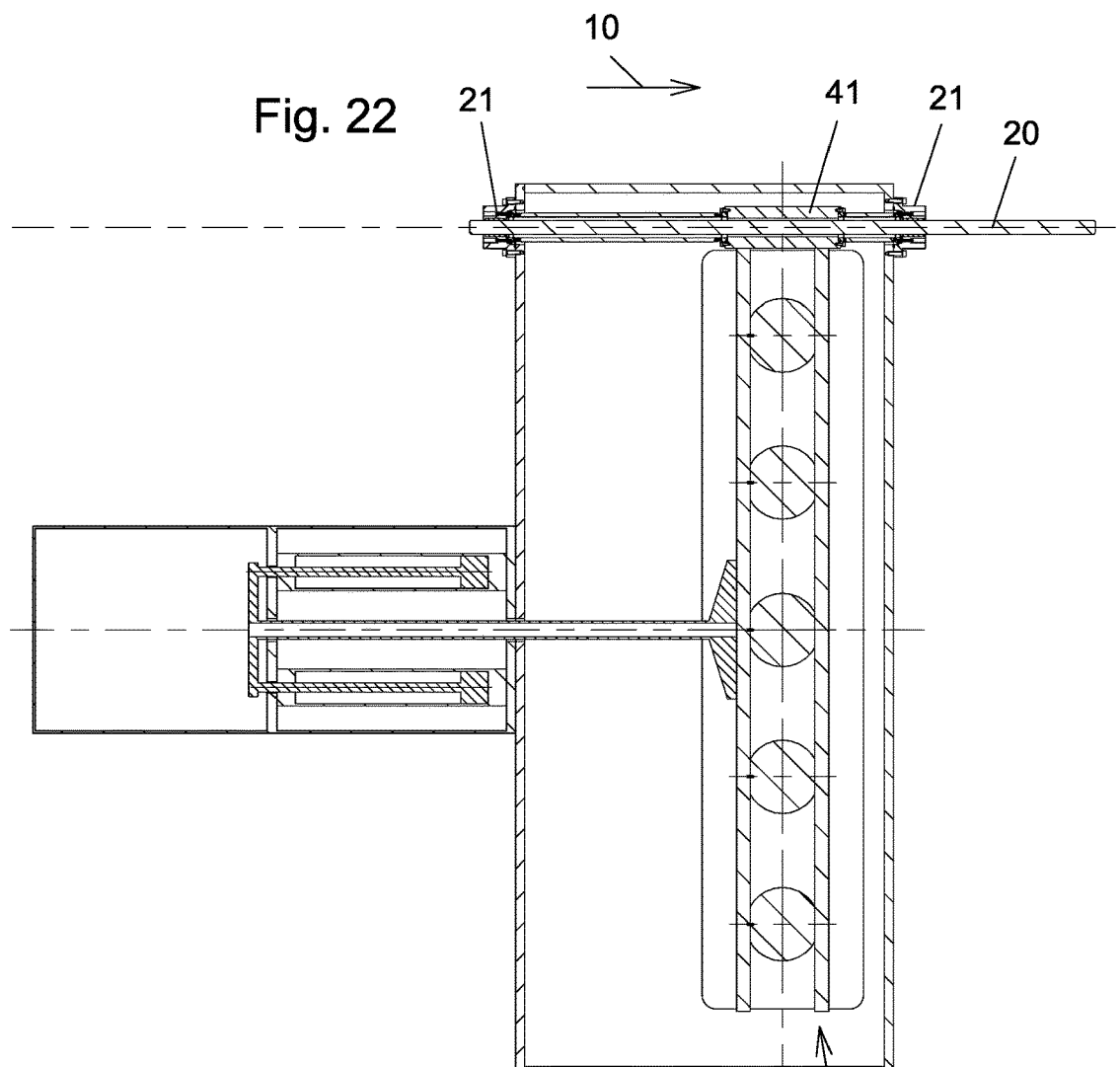
Figure 23:
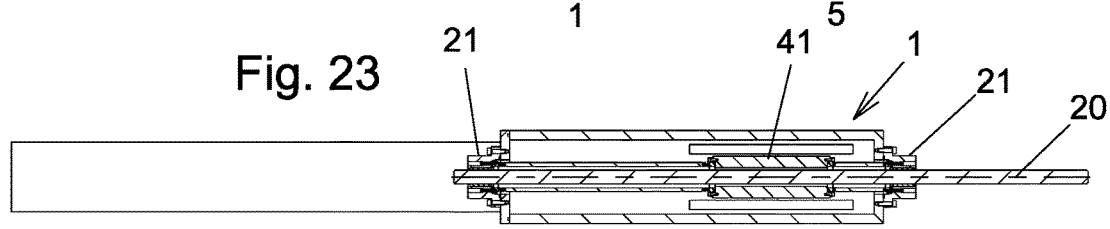
Figure 24:
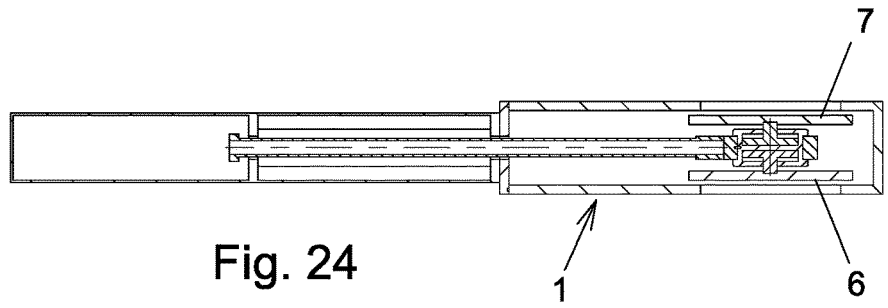

In order, in the open state of said plug-in connection, to support the guide rod 20 in the region of its end remote from the wall 34 against sinking downwards, use is made of a U-shaped supporting plate 35 which can best be seen in FIG. 16. The supporting plate 35 is fastened at one end to the wall 34 and at the other end supports the guide rod 20 by, in the exemplary embodiment, having an opening into which the end piece 24 of the diaphragm bellows 23 is fitted. Given sufficient rigidity of the guide rod 20, the supporting plate can also be dispensed with.

All or some of the end pieces 24 of the diaphragm bellows 22, 23 could also be omitted, wherein the diaphragm bellows 22, 23 could be directly welded at their ends to the parts to be connected to said ends.

As already mentioned, the plug-in piece 30 could also be omitted and the guide rod 20 could be plugged at its end directly through the opening 23 in the valve housing into the recess in the connection piece 33.

Given a sufficiently thick design of the wall of the valve housing, the connection piece 33 could also be omitted and the end of the guide rod 20 could be plugged directly into a recess in the wall of the valve housing.

In the exemplary embodiment, the cup-shaped design of the connection piece 26 serves for accommodating part of the pushed-together diaphragm bellows 22 in the open position of the vacuum valve. In the case of a correspondingly larger design of the valve housing, the cup-shaped design of the connection piece 26 could also be omitted and the latter could be designed, for example, merely as a cover. It would also be conceivable and possible for the connection piece 26 to be completely omitted and for the end of the guide rod 20 to be fastened directly to the wall 34, for example by welding.

In order to be able to absorb different thermal expansions in the region of the valve housing and of the closure unit 5, in particular during torching of the vacuum system into which the vacuum valve is fitted, the drive housing 37 of the longitudinal drive 11 can be connected to the valve housing 1 in a displaceable manner in a direction lying at right angles to the longitudinal direction 10 and at right angles to the axes 13, 14 of the valve openings 2, 3. The weight of the longitudinal drive 11 can be absorbed here by a spring device. Designs of this type are known. A connection of the valve rod 9 to the closure unit 5, the connection being movable in a direction at right angles to the longitudinal direction 10 and at right angles to the axes 13, 14 of the valve openings 2, 3, could also be provided.

By means of the movable connection of the drive housing 37 to the valve housing 1 or the movable connection of the valve rod 9 to the closure unit 5, it can thereby also be ensured that the weight of the closure unit 5 is supported by the longitudinal guide 19.

In the exemplary embodiment, a longitudinal guide 19 is therefore present exclusively above the closure unit 5, as is preferred. In other embodiments, guide parts which support the closure unit against displacement parallel to the axes 13, 14 of the valve openings 2, 3, but preferably do not support the weight of the closure unit 5, could be present below the closure unit.

If it is intended to carry out servicing of the vacuum valve, a servicing-assisting device 38 can be attached to the valve housing 1. This here is a holding rail 39 which is fastened (in particular screwed) to the valve housing 1 and has a linear guide via which a supporting arm 40 is guided displaceably along the holding rail 39. The supporting arm 40 is fastened (in particular screwed) to the removable wall 34 of the valve housing 1. As a result, the screw connections of the walls 34 are unscrewed, and the unit comprising the wall 34, the longitudinal guide 19 held on the wall 34, the closure unit 5 and the longitudinal drive 11, is pulled out of the remaining part of the valve housing 1. The plug-in connection of that end region of the guide rod 20 which is remote from the wall 34 to the wall 43 of the valve housing 1 is released here, cf. FIG. 14. The pulled-out unit is illustrated once again in FIGS. 15 and 16 (without the servicing-assisting device).

After the servicing has been completed, the unit is pushed in again, wherein that end of the guide rod 20 which is remote from the wall 34 and has the plug-in piece 30 arranged thereon is pushed again into the opening 32 in the wall and into the recess of the connection piece 33, i.e. the plug-in connection is closed again.

The plug-in connection for that end of the guide rod 20 which is remote from the wall 34 could also be designed in a modified manner, for example, as already mentioned, without the plug-in piece 30.

Different further modifications of the exemplary embodiment described are conceivable and possible without departing from the scope of the invention. For example, two guide parts 21 which are spaced apart from each other in the longitudinal direction 10 and are connected to each other by a diaphragm bellows could be provided.

A second exemplary embodiment of the invention is illustrated in FIGS. 17 to 28. Apart from the differences described below, the design of the second exemplary embodiment corresponds to that of the first exemplary embodiment, and the description of the first exemplary embodiment and of the possible modifications thereof also applies to the second exemplary embodiment. Identical or at least analogous parts are denoted by the same reference signs as in the first exemplary embodiment.

The substantial difference of the second exemplary embodiment in relation to the first exemplary embodiment is provided in that the closure unit 5 is attached here to the guide rod 20 of the longitudinal guide 19, wherein the guide rod 20 is displaced together with the closure unit 5 during the displacement of the closure unit 5 parallel to the longitudinal direction 10 by the longitudinal drive 11. Two sleeve-shaped guide parts 21 through which the guide rod 20 passes and which are attached to the valve housing 1 are provided here.

The supporting unit 8 can be fastened to the guide rod 20, for example, via a sleeve-shaped connecting piece 41 through which the guide rod 20 passes and which is connected non-displaceably to the guide rod 20 in the longitudinal direction thereof. The one ends of the diaphragm bellows 22, 23 are connected in a vacuum-tight manner to opposite sides of the connecting piece 41. The other ends of the diaphragm bellows 22, 23 are connected in a vacuum-tight manner to the guide parts 21. The connections to the connecting piece 41 and the guide parts 21 can be designed in an analogous manner as the connections of the diaphragm bellows 22, 23 to the guide part 21 and to the connection pieces 26, 33 in the first exemplary embodiment.

The bearing elements 36 for the displaceable mounting of the guide rod 20 in relation to the guide parts 21 can be formed in an analogous manner as in the first exemplary embodiment. These bearing elements 36 are located in the region of the passage openings in the guide parts 21.

The space between the diaphragm bellows 22, 23 and the guide rod 20 is sealed in relation to the vacuum region 4 of the valve housing 1. This sealed space furthermore extends through gaps between the passage opening in the connecting piece 41 and the guide rod 20. The space which is sealed in relation to the vacuum region 4 therefore at least partially lies within the valve housing 1. Starting from those ends of the diaphragm bellows which are remote from the connecting piece 41, said sealed space furthermore extends over the intermediate space between the inner passage opening in the guide parts 21 and the guide rod 20 and is furthermore connected to the atmosphere (could basically also be evacuated). The region in which the bearing elements 36 of the guide parts 21 are located is therefore sealed in relation to the vacuum region 4 of the valve housing 1.

The mutually facing ends of the diaphragm bellows could also be connected in a vacuum-tight manner directly to the guide rod 20, for example could be welded thereto.

Instead of diaphragm bellows 22, 23, in said second exemplary embodiment sliding lead-throughs with sealing rings as sealing means could also be provided in order to lead the guide rod 20 out of the valve housing through the openings 28, 32 therein in a sealed manner.

In order, in said second exemplary embodiment, to be able to remove the wall 34 with the parts attached thereto for servicing purposes, first of all the connection of the diaphragm bellows 23 to the associated guide part 21 has to be released here.

In a further exemplary embodiment of the invention, the closure unit 5 could also be provided only for the vacuum-tight closure of an individual valve opening. In order to form a through channel through the vacuum valve in the open state of the vacuum valve, a further opening would be present in the valve housing, preferably in the wall lying opposite the valve opening, wherein said further opening would not have any valve seat. For supporting the closure unit 5 on the side opposite the longitudinal guide 19 in the closed state of the vacuum valve, a corresponding support element for the closure unit could then be present.

Such a vacuum valve designed in the manner according to the invention would therefore only have one valve opening and only one valve plate.

In further embodiments of the invention, only a longitudinal drive, but no transverse drive, could also be present for opening and closing the vacuum valve. For this purpose, the longitudinal drive could actuate corresponding spreading members during closure of the vacuum valve, or a three-dimensional sealing surface could be present. Such designs of spreading members and three-dimensional sealing surfaces are known, for example from the documents mentioned in the introductory part of the description.

KEY TO THE REFERENCE NUMBERS

1 Valve housing
2 First valve opening
3 Second valve opening
4 Vacuum region
5 Closure unit
6 First valve plate
7 Second valve plate
8 Supporting unit
9 Valve rod
10 Longitudinal direction
11 Longitudinal drive
12 Yoke
13 Axis
14 Axis
15 Transverse drive
16 Transverse direction
17 First support rod
18 Second support rod
19 Longitudinal guide
20 Guide rod
21 Guide part
22 Diaphragm bellows
23 Diaphragm bellows
24 End piece
25 Sealing ring
26 Connection piece
27 Sealing ring
28 Opening
29 Sealing ring
30 Plug-in piece
31 Sealing ring
32 Opening
33 Connection piece
34 Wall
35 Supporting plate
36 Bearing element
37 Drive housing
38 Servicing-assisting device
39 Holding rail
40 Supporting arm
41 Connecting piece
42 Seal
43 Wall
44 Opening

The invention claimed is:
1. A vacuum valve, comprising:
a valve housing having a vacuum region in an interior thereof,
a closure unit arranged in the vacuum region of the valve housing that is adapted to close at least one valve opening in the valve housing in a closed state of the vacuum valve,
a longitudinal drive that adjusts the closure unit in a longitudinal direction for adjusting the closure unit between a position opening up the valve opening and a position covering the valve opening,
a longitudinal guide for the displaceable guiding of the closure unit parallel to the longitudinal direction, said longitudinal guide having a guide rod extending parallel to the longitudinal direction, and at least one guide part, the guide rod is attached to the valve housing, and the at least one guide part, which is arranged in the interior of the valve housing, is attached to the closure unit and is guided displaceably parallel to the longitudinal direction by the guide rod, wherein the guide rod passes through a passage opening through the at least one guide part, the at least one guide part has at least one bearing element for mounting the guide part in relation to the guide rod so as to be displaceable parallel to the longitudinal direction, the at least one bearing element is arranged in a region sealed off from the vacuum region of the valve housing, the at least one guide part is connected to at least one diaphragm bellows which forms a continuation of the sealed region and through which the guide rod extends, and the guide rod extends between a first wall of the valve housing, with said first wall being removable from a basic body of the valve housing, and an opposite second wall of the valve housing, and the guide rod is connected in a region of the second wall to the valve housing via a plug-in connection, wherein, when the first wall is removed from the basic body of the valve housing, the guide rod remains connected to the first wall and the plug-in connection is released.

2. The vacuum valve according to claim 1, wherein the closure unit is held hanging on the longitudinal guide.

3. The vacuum valve according to claim 1, wherein the guide rod has a circular cross section.

4. The vacuum valve according to claim 1, wherein the at least one diaphragm bellows comprises first and second diaphragm bellows that are arranged on opposite sides of the at least one guide part, said first and second diaphragm bellows being connected to the guide part and being a continuation of the sealed region, in which the at least one bearing element is arranged, and through which the guide rod extends.

5. The vacuum valve according to claim 1, further comprising a profiled supporting plate fastened to the first wall supports the guide rod in an end region remote from the first wall.

6. The vacuum valve according to claim 1, wherein the longitudinal direction lies horizontally or is at an angle of less than 30° with respect to horizontal.

7. The vacuum valve according to claim 1, wherein the sealed region within which the at least one bearing element is arranged is connected to atmosphere or is evacuated.

8. The vacuum valve according to claim 1, wherein the closure unit is attached to a valve rod which is oriented parallel to the longitudinal direction.

9. The vacuum valve according to claim 1, wherein the closure unit has first and second valve plates and the at least one valve opening comprises opposite first and second valve openings that are closable by the first and second valve plates in the closed state of the vacuum valve.

10. The vacuum valve according to claim 1, wherein the at least one valve opening has a length (l) which is measured at right angles to an axis of the at least one valve opening and at right angles to the longitudinal direction and is more than four times as large as a width (b) measured parallel to the longitudinal direction.

* * * * *